(12) United States Patent
Lai

(10) Patent No.: US 12,085,187 B1
(45) Date of Patent: Sep. 10, 2024

(54) GAS VALVE INCLUDING TIMER

(71) Applicant: HWEI KEH ENTERPRISE CO., LTD., Taichung (TW)

(72) Inventor: Jih-Ching Lai, Taichung (TW)

(73) Assignee: HWEI KEH ENTERPRISE CO., LTD., Taichung (TW)

( * ) Notice: Subject to any disclaimer, the term of this patent is extended or adjusted under 35 U.S.C. 154(b) by 8 days.

(21) Appl. No.: 18/136,859

(22) Filed: Apr. 19, 2023

(51) Int. Cl.
*F16K 31/48* (2006.01)
(52) U.S. Cl.
CPC .................................. *F16K 31/485* (2013.01)
(58) Field of Classification Search
CPC ................................ F16K 31/48; F16K 31/485
USPC ..................................................... 137/624.11
See application file for complete search history.

(56) References Cited

U.S. PATENT DOCUMENTS

| 3,024,812 | A | * | 3/1962 | Bydalek | .................. | F16K 31/48 |
| | | | | | | 251/77 |
| 3,803,923 | A | * | 4/1974 | Hajny | ..................... | G04F 3/027 |
| | | | | | | 968/813 |
| 6,755,213 | B1 | * | 6/2004 | Lai | .......................... | F23N 1/007 |
| | | | | | | 137/624.11 |
| 2018/0271324 | A1 | * | 9/2018 | Arnold | .................. | F16K 31/485 |

* cited by examiner

*Primary Examiner* — Hailey K. Do
(74) *Attorney, Agent, or Firm* — Leong C. Lei

(57) ABSTRACT

An improved gas valve including a timer includes: a valve body including a direction indicating mark; a timer arranged in an interior of the valve body; a rotary knob connected to the timer and including a protrusion, the rotary knob being provided, in a circumferentially arranged manner, with a closure region, a full opening region at one side of the closure region, and a time counting region at an opposite side of the closure region; a stop device mounted to the valve body, the stop device being subjected to an elastic effect to reciprocally move between a stop position and a passage position in such a way as to be normally set at the stop position as being acted upon by the elastic effect and located on a rotating path of the protrusion of the rotary knob.

8 Claims, 13 Drawing Sheets

GAS VALVE INCLUDING TIMER

TECHNICAL FIELD OF THE INVENTION

The present invention relates generally to a gas valve, and more particularly to an improved gas valve including a timer.

DESCRIPTION OF THE PRIOR ART

An early-developed known gas valve, such as that disclosed in U.S. Pat. No. 6,755,213, includes a rotary knob to drive a timer for closing the valve at a scheduled time. However, the rotary knob of such a gas valve is only allowed to rotate between closure and time counting. In other words, when the gas valve is opened, the timing function is actuated simultaneously therewith. For users for operation with an extended period, it is very likely that the valve becomes closed automatically due to time counting being over, no matter how long the countable timing schedule may be set, and this causes inconvenience for the operation.

Thus, as shown in FIGS. 1-3, a prior art gas valve 1 is structured such that a rotary knob 2 is rotatable for an angular range of 315 degrees to allow for selection among three regions, which are respectively, a closure region 3 ("OFF", as shown in FIG. 1), a timing region 4 (selectable for 1-60 minutes, as shown in FIG. 2), and a full opening region 5 ("ON", no time counting, as shown in FIG. 3). This resolves the above-discussed issue of the valve being automatically closed due to the timing functions always actuated in accompany with the opening of the valve. However, such a structure of valve is not provided with a safety arrangement, so that when a user attempts to stop time counting by rotating the rotary knob 2 to the closure region (OFF) 3, over-rotating may easily occur to reach the full opening region (ON) 5, resulting in certain concerns about operation safety.

SUMMARY OF THE INVENTION

In view of the above, to improve the issue of the prior art that the know gas valve may easily suffer over-rotating to unexpectedly activate the fully open region.

An objective of the present invention is to provide an improved gas valve including a timer, wherein a safety arrangement is additionally included to make a rotary knob from directly rotating from a closure region to a fully open region in order to ensure operation safety.

Another objective of the present invention is to provide an improved gas valve including a timer, which has a simple structure, has a reduced fabrication cost, and is easy to assemble.

Thus, the present invention provides an improved gas valve including a timer, which comprises: a valve body, which is formed, in an interior thereof, with a valve compartment and is provided, in an exterior thereof, with an inlet opening extending to and in communication with the valve compartment and an outlet opening extending to and in communication with the valve compartment, a valve core being arranged in an interior of the valve compartment, the valve core being adapted to be operated by an external force to switchably set the inlet opening to be in communication with or not in communication with the outlet opening, a direction indicating mark being arranged on a surface of the valve body; a timer, which is mounted to the valve body and is fixed in the interior of the valve compartment, the timer being connected to the valve core to control opening and closing of the valve core; a rotary knob, which is arranged on the valve body and connected with the timer, the rotary knob having a bottom surface that is provided with a protrusion, the rotary knob having a top surface that is provided, in a circumferentially arranged form, a closure region, a full opening region at one side of the closure region, and a time counting region at an opposite side of the closure region; and a stop device, which is mounted to the valve body, the stop device being operated with an elastic effect to be reciprocally movable between a stop position and a passage position in such a way as to be set at the stop position as being acted upon by the elastic effect to be located on a rotating path of the protrusion of the rotary knob, wherein when the closure region of the rotary knob is in alignment with the direction indicating mark, the protrusion is in contact engagement with the stop device to prevent the closure region from moving to pass over the direction indicating mark, and when the stop device is at the passage position, the stop device is moved out of and does not stay on the rotating path of the protrusion of the rotary knob. As such, effects of enhancing operation safety and reducing fabrication cost can be achieved.

DETAILED DESCRIPTION OF THE PREFERRED EMBODIMENT

Referring to FIGS. 4-13, a gas valve including a timer according to a preferred embodiment of the present invention, generally designated at 100, comprises a valve body 10, a timer 20, a rotary knob 30, and a stop device 40.

Figure 1:
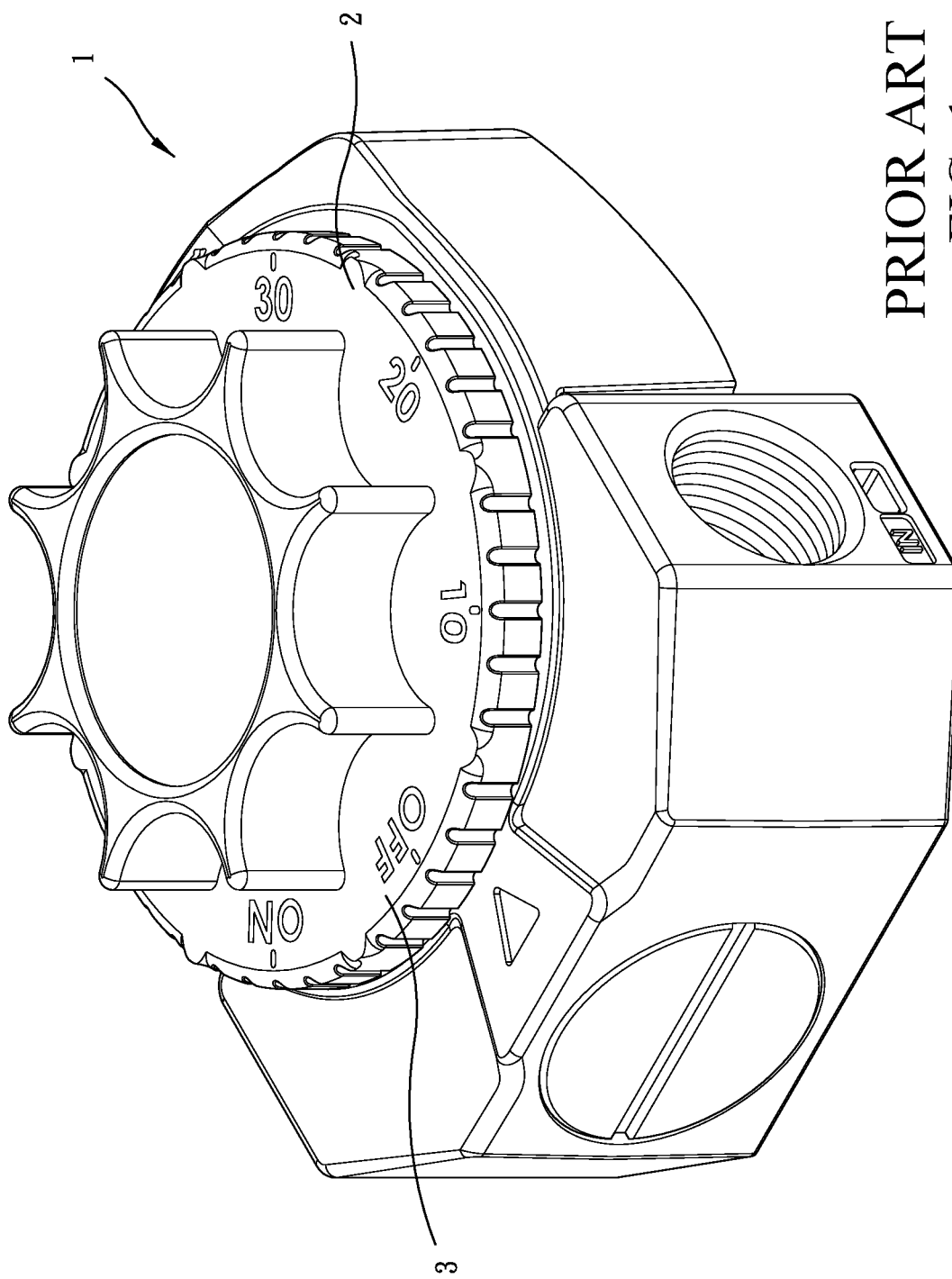
FIG. 1 is a schematic view showing a prior art gas valve in a closure region.
Figure 2:
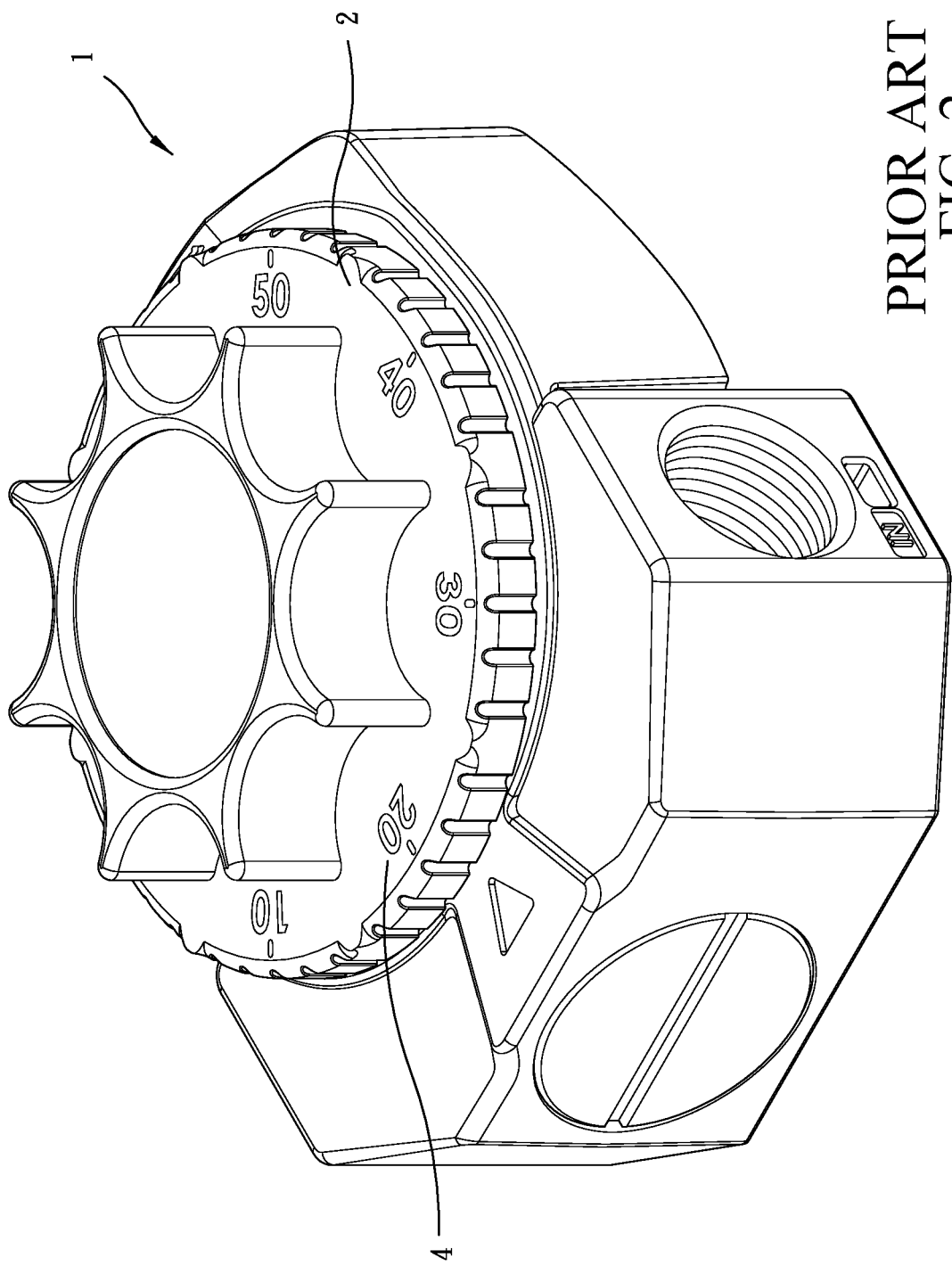
FIG. 2 is a schematic view showing the prior art gas valve in a time counting region.
Figure 3:
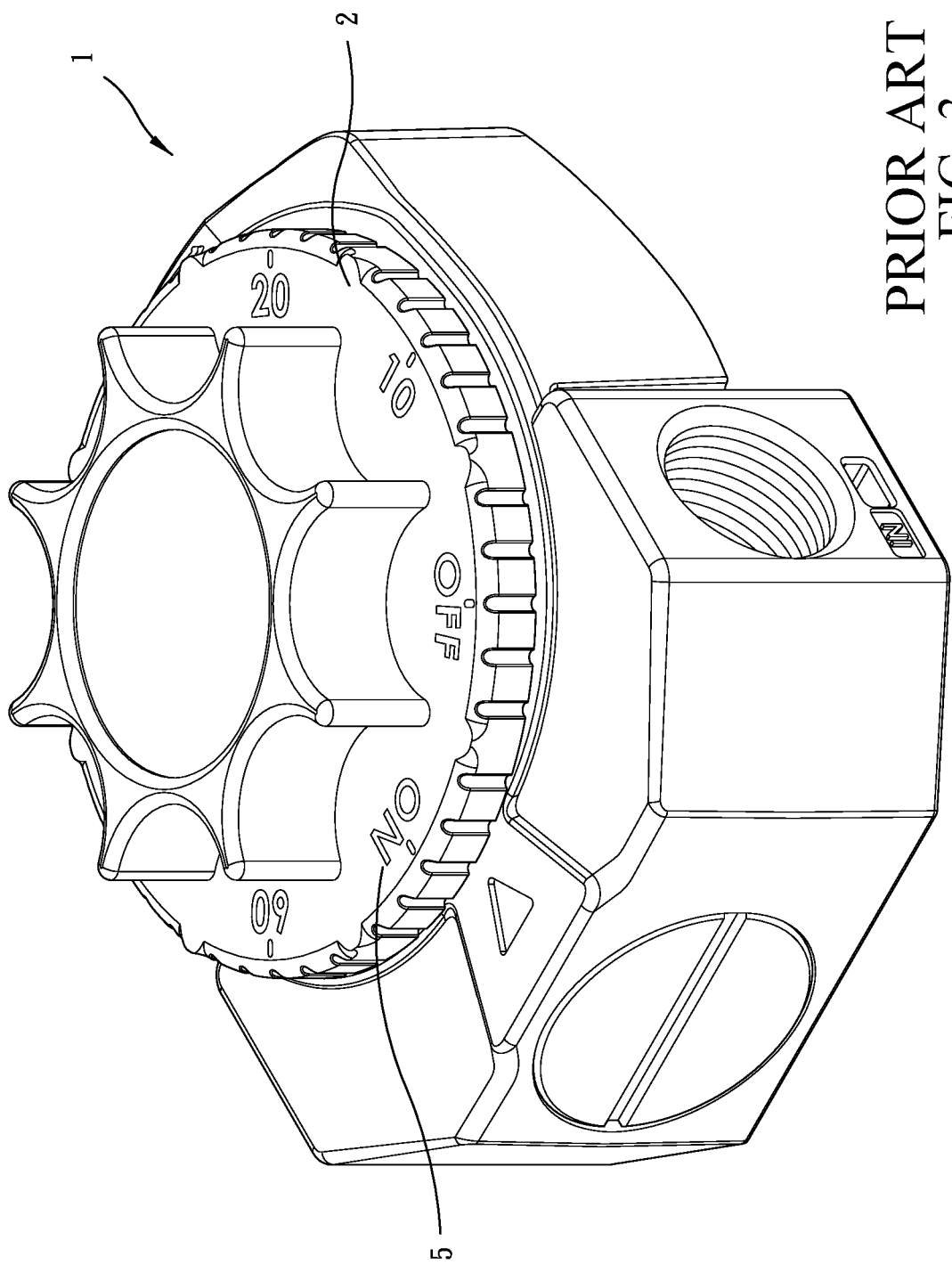
FIG. 3 is a schematic view showing the prior art gas valve in a full opening region.
Figure 4:
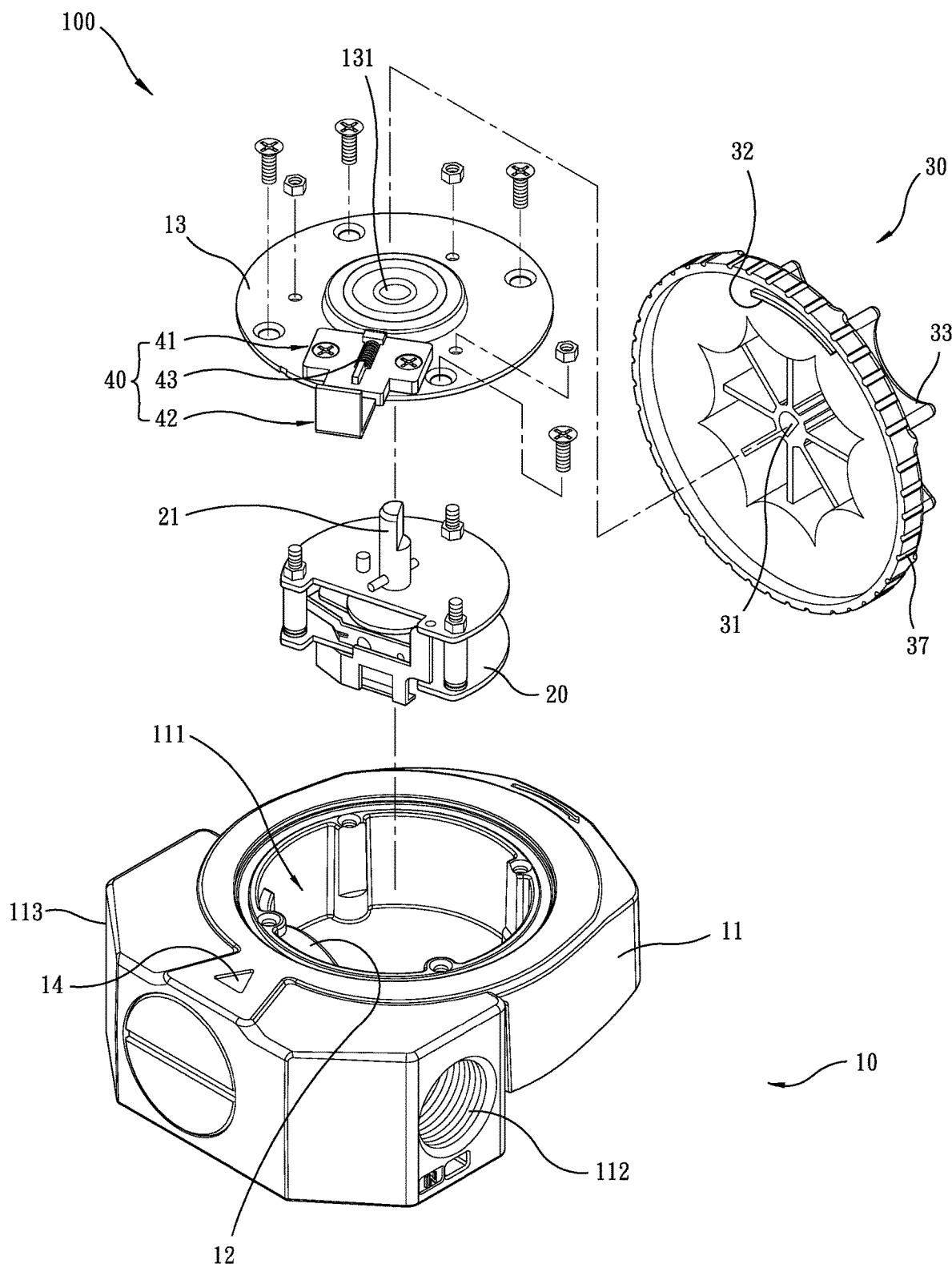
FIG. 4 is an exploded view showing a preferred embodiment of the present invention.
Figure 5:
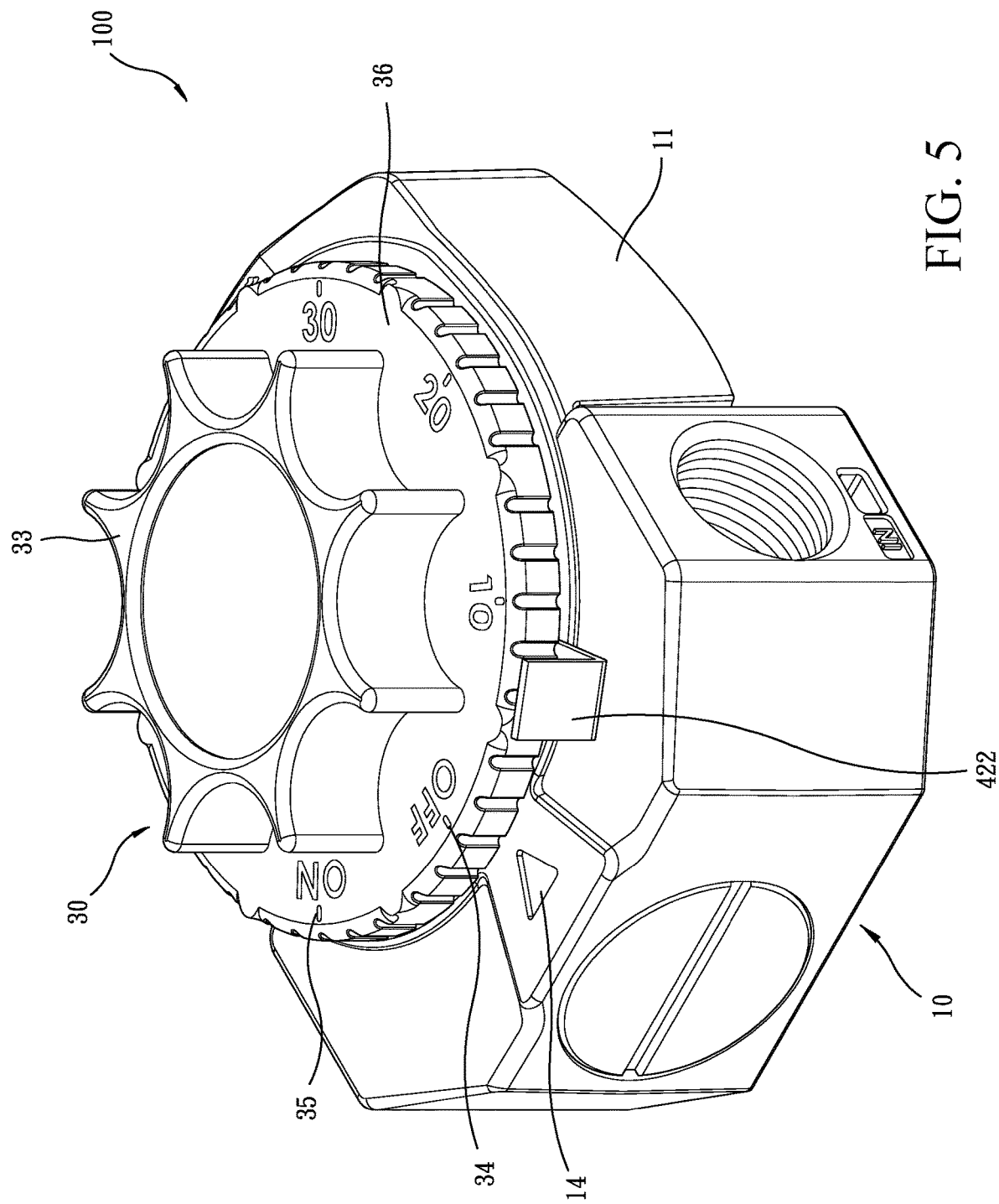
FIG. 5 is a perspective view showing the embodiment of FIG. 4 is in an assembled state.
Figure 6:
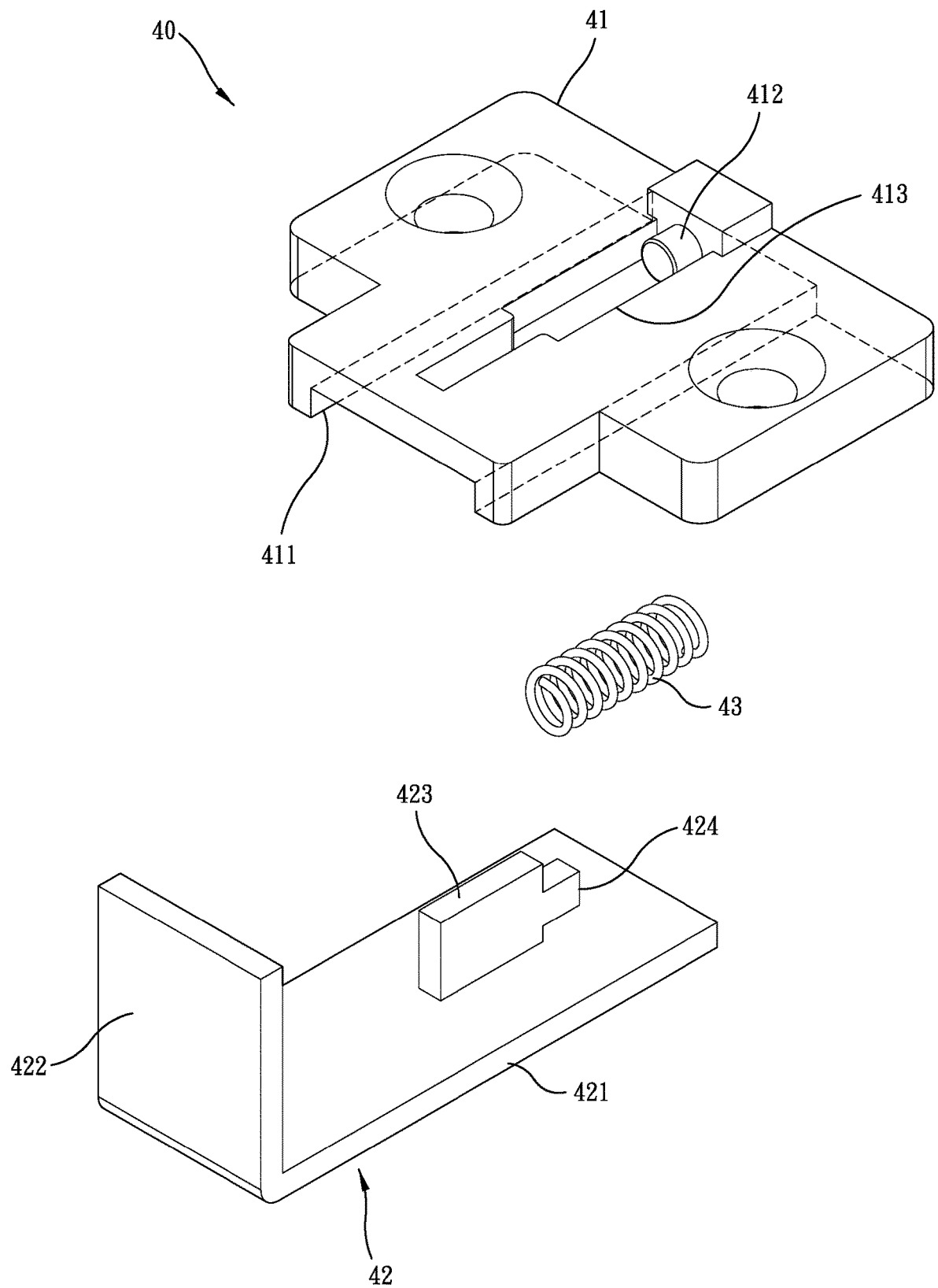
FIG. 6 is an exploded view showing components of the embodiment of FIG. 4.
Figure 7:
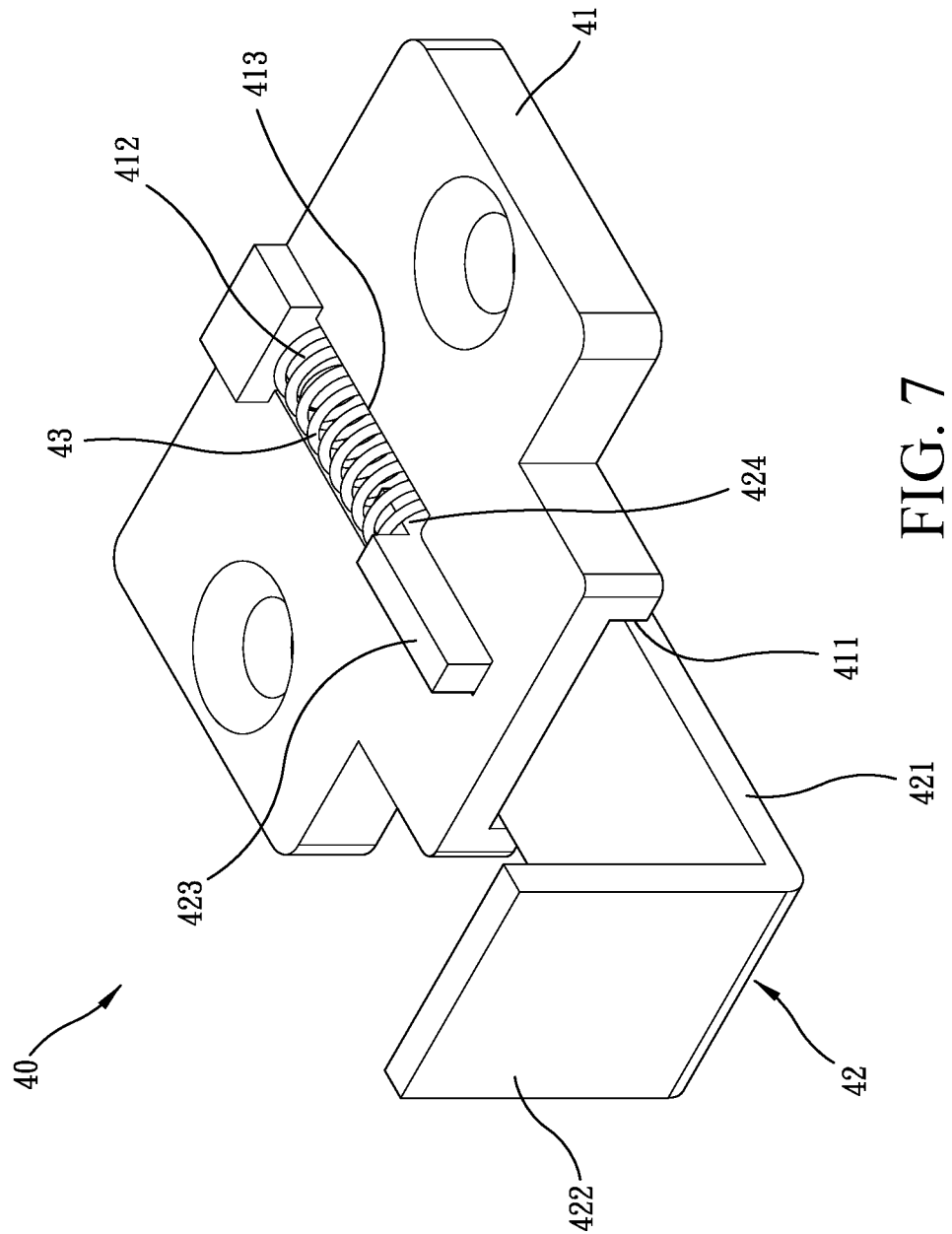
FIG. 7 is a perspective view showing the components of the embodiment of FIG. 4 in an assembled state.

Referring to FIGS. 4 and 5, the valve body 10 includes a valve base 11, a valve core 12, and a valve cover 13. The valve base 11 includes a valve compartment 111, an inlet opening 112 that communicates the valve compartment 111 with the outside, and an outlet opening 113 that communicates the valve compartment 111. The inlet opening 112 is arranged to receive gas to flow inwards, and the outlet opening 113 allows gas to flow out. The valve base 11 is provided, on a surface thereof, with a direction indicating mark 114. The valve core 12 is arranged in an interior of the valve compartment 111 and is switchable, upon being acted upon by an external force, between an open state and a closed state. When the valve core 12 is opened, the inlet opening 112 is set in communication with the outlet opening 113 to allow gas to flow therethrough, and when the valve core 12 is closed, the inlet opening 112 is not in communication with the outlet opening 113 to prevent gas from flowing therethrough. The valve cover 13 is fastened and fixed to the valve base 11 to close the valve compartment 111. The valve cover 13 is formed, in a central location thereof, with a through hole 131 that penetrates through top and bottom thereof.

Referring to FIG. 4, the timer 20 is mounted to the valve cover 13 of the valve body 10 and is fixed in the interior of the valve compartment 111. The timer 20 is connected to the valve core 12 to control the valve core 12 to open and close. The timer 20 has a driving axle 21 that extends through the through hole 131 of the valve body 10 to the outside. The driving axle 21 has a cross section that is noncircular.

Referring to FIGS. 4 and 5, the rotary knob 30 is integrally formed as a one-piece structure having a fitting and connecting recess 31 that has a noncircular cross section formed axially in a bottom thereof. The fitting and connecting recess 31 and the driving axle 21 of the timer 20 are connected through insertion and are thus rotatable in unison with each other, so that operation of the timer 20 is controllable through the rotary knob 33 being caused to rotate by a force acting thereon. The rotary knob 30 is provided, on a bottom surface thereof, with a protrusion 32, and the rotary knob 30 is provided, on a top surface thereof, with a force application portion 33 that serves as an interface for a user to apply a force thereto to control the rotary knob 30 to rotate. The rotary knob 30 is also formed, on the top surface thereof and arranged circumferentially, with a closure region 34(OFF), a full opening region 35(ON) at one side of the closure region 34, and a time counting region 36 (digitals 1 to 60) at an opposite side of the closure region 34. The rotary knob 30 is provided, on a circumferential surface thereof, with a plurality of graduations 37 that are circumferentially arranged at intervals.

Referring to FIGS. 4-7, the stop device 40 is reciprocally movable, in response to an action of an elastic effect, between a stop position and a passage position in such a way as to be normally set at the stop position when being acted upon by the elastic effect and located on a rotating path of the protrusion 32 of the rotary knob 30. The stop device 40 includes a base 41, a movable seat 42, and an elastic member 43. The base 41 is mounted to the valve cover 13 of the valve body 10. The base 41 includes a slide channel 411, a base engaging portion 412 arranged on a bottom wall of the slide channel 411, and a through opening 413 penetrating through top and bottom of the base 41. The movable seat 42 includes a slide portion 421, an interface portion 422 connected to one end of the slide portion 421 and a stop portion 423 protruding from a top surface of the slide portion 421. One end of the stop portion 423 includes a movable-seat engaging portion 424. The slide portion 421 is slidably received in the slide channel 411 of the base 41, such that the stop portion 423 extends through the through opening 413. The elastic member 43 includes a spring, of which one end is supported on the base engaging portion 412 of the base 41 and an opposite end supported on the movable-seat engaging portion 424 of the movable seat 42. The movable seat 42 is depressible by an external force applied thereto to reciprocally move between a stop position and a passage position. When the movable seat 42 is acted upon by an external force to compress the elastic member 43 for moving toward the passage position, the stop portion 423 is moved out of and no longer stays on the rotating path of the protrusion 32 of the rotary knob 30; and when the movable seat 42 is acted upon by the spring force of the elastic member 43 to be biased outward to reach the stop position, the stop portion 423 is moved back to be located on the rotating path of the protrusion 32 of the rotary knob 30.

The above provides a description to the components of the gas valve including a timer 100 according to the preferred embodiment of the present invention, as well as assembling thereof, and in the following operation and features thereof will be discussed.

Figure 8:
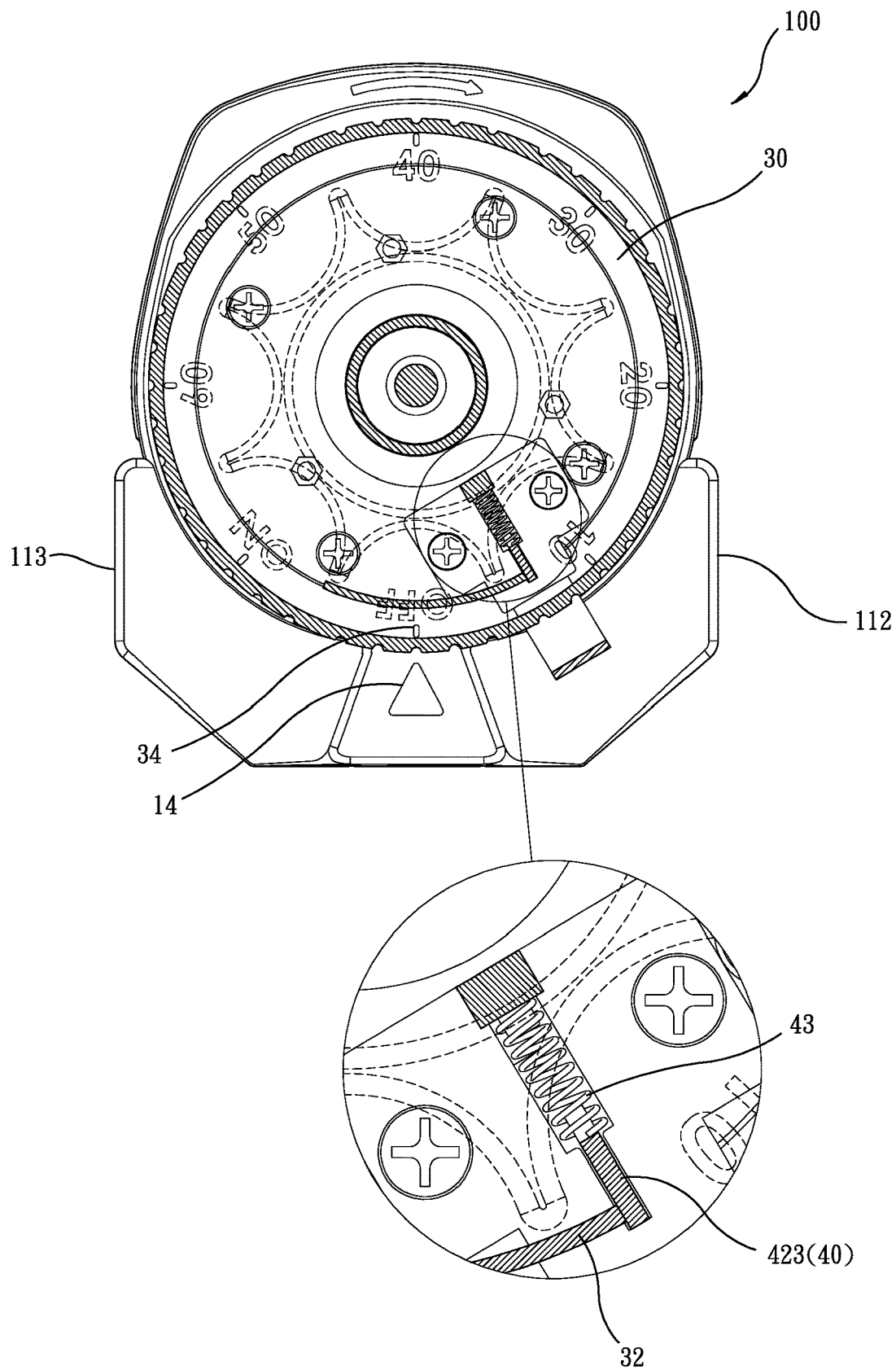
FIGS. 8-13 are schematic views showing operation of the embodiment of FIG. 4.

Firstly, when the gas valve including a timer 100 according to the present invention is not in use, due to an effect of the timer 20, the closure region 34 of the rotary knob 30 is set in alignment with the direction indicating mark 14 (as shown in FIG. 8), wherein the protrusion 32 of the rotary knob 30 is kept in contact engagement with the stop portion 423 of the stop device 40, and consequently, gas is not allowed to flow from the inlet opening 112 toward the outlet opening 113.

Figure 9:
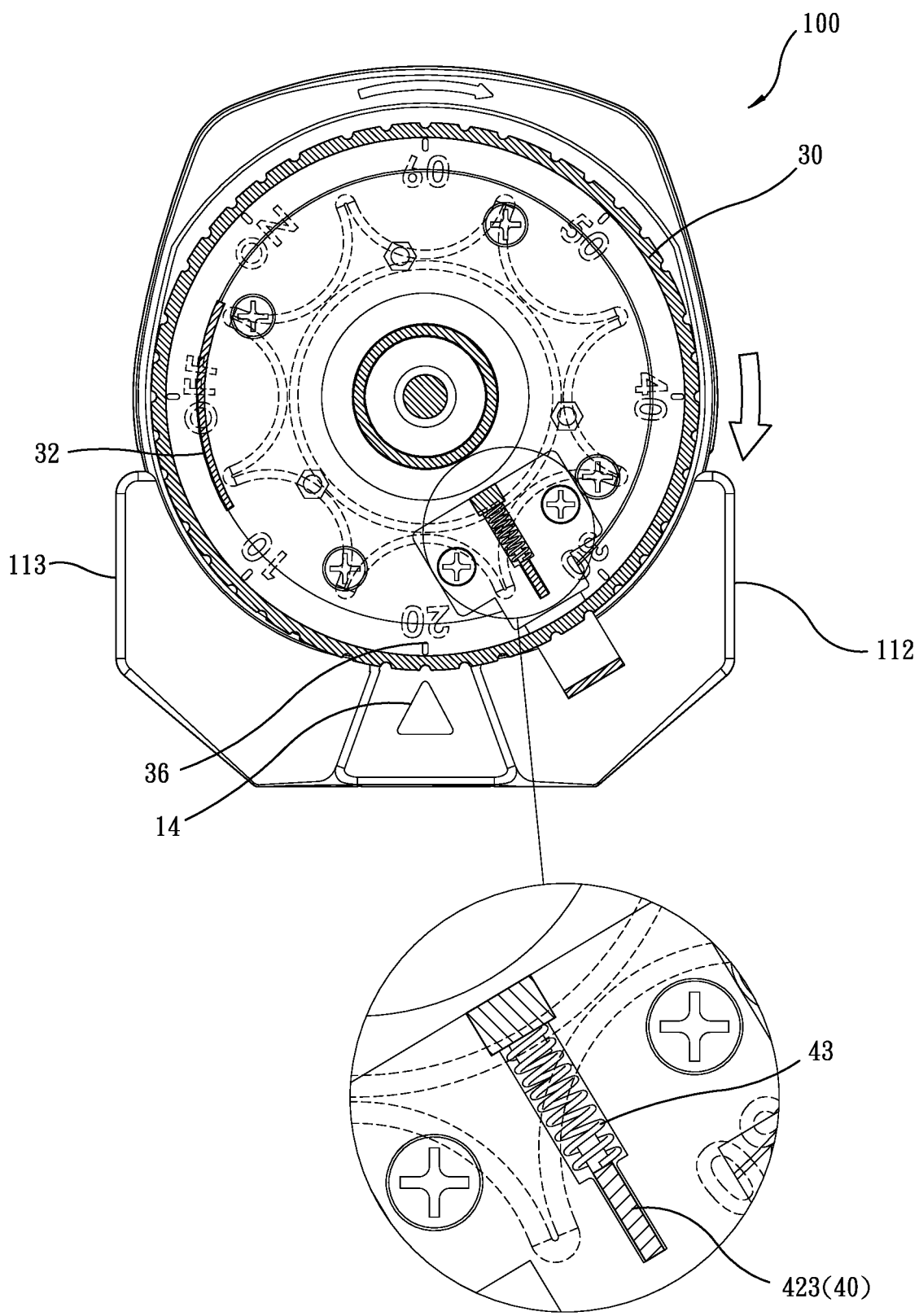

Next, a user, when attempting to activate the present invention by operating the timer, rotates the rotary knob 30 in for example the clockwise direction to have a desired timing portion of the time counting region 36 aligned with the direction indicating mark 14 (as shown in FIG. 9), wherein the rotary knob 30 drives the timer 20 and thus opens the valve core 12 (this being known in the prior art and not shown in the drawings), so as to allow gas to flow from the inlet opening 112 toward the outlet opening 113, and consequently, gas can be consumed in a timing manner such that the valve core 12 is closed when the desired time of operation, as being so counted, is reached.

Figure 10:
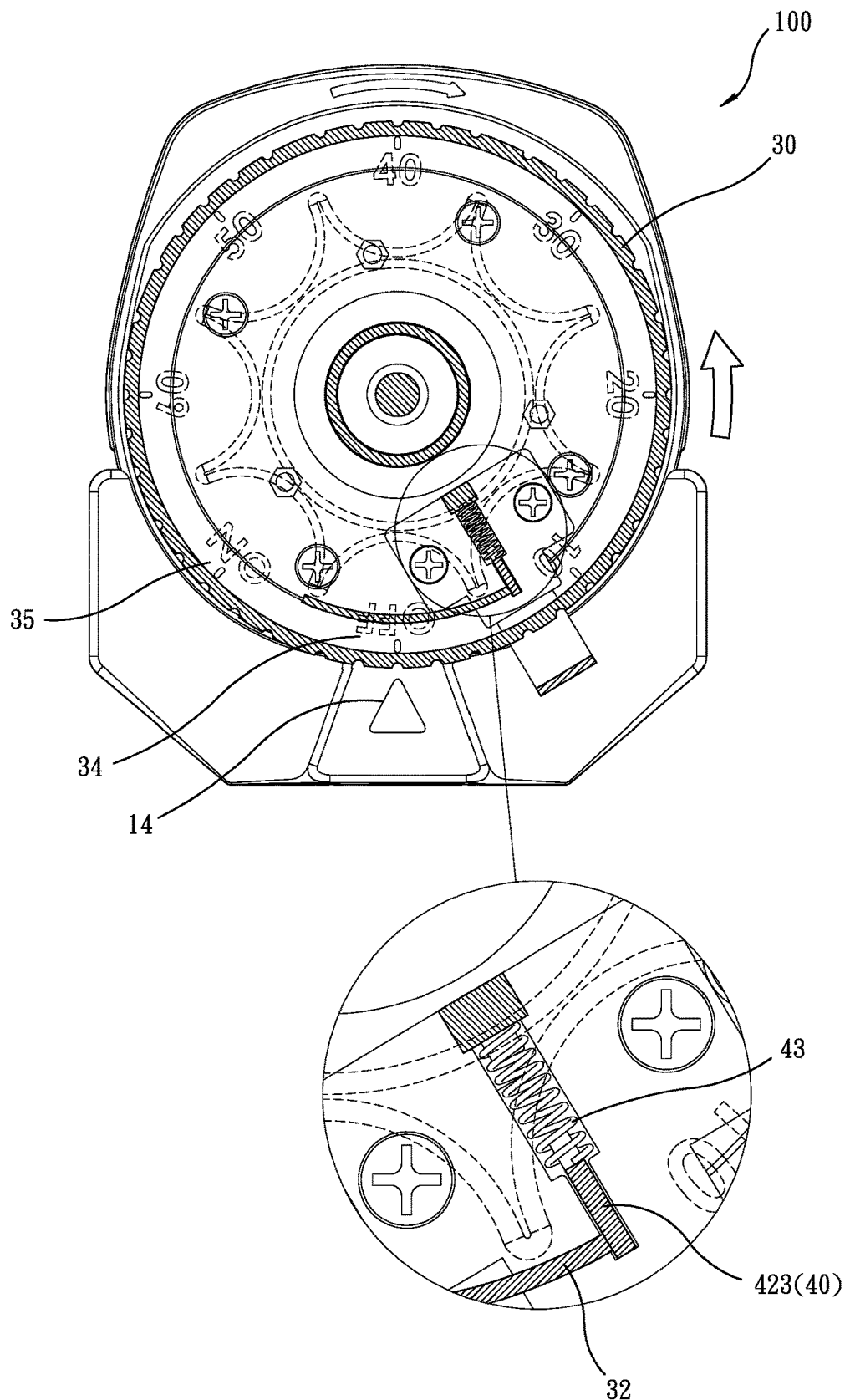
Figure 12:
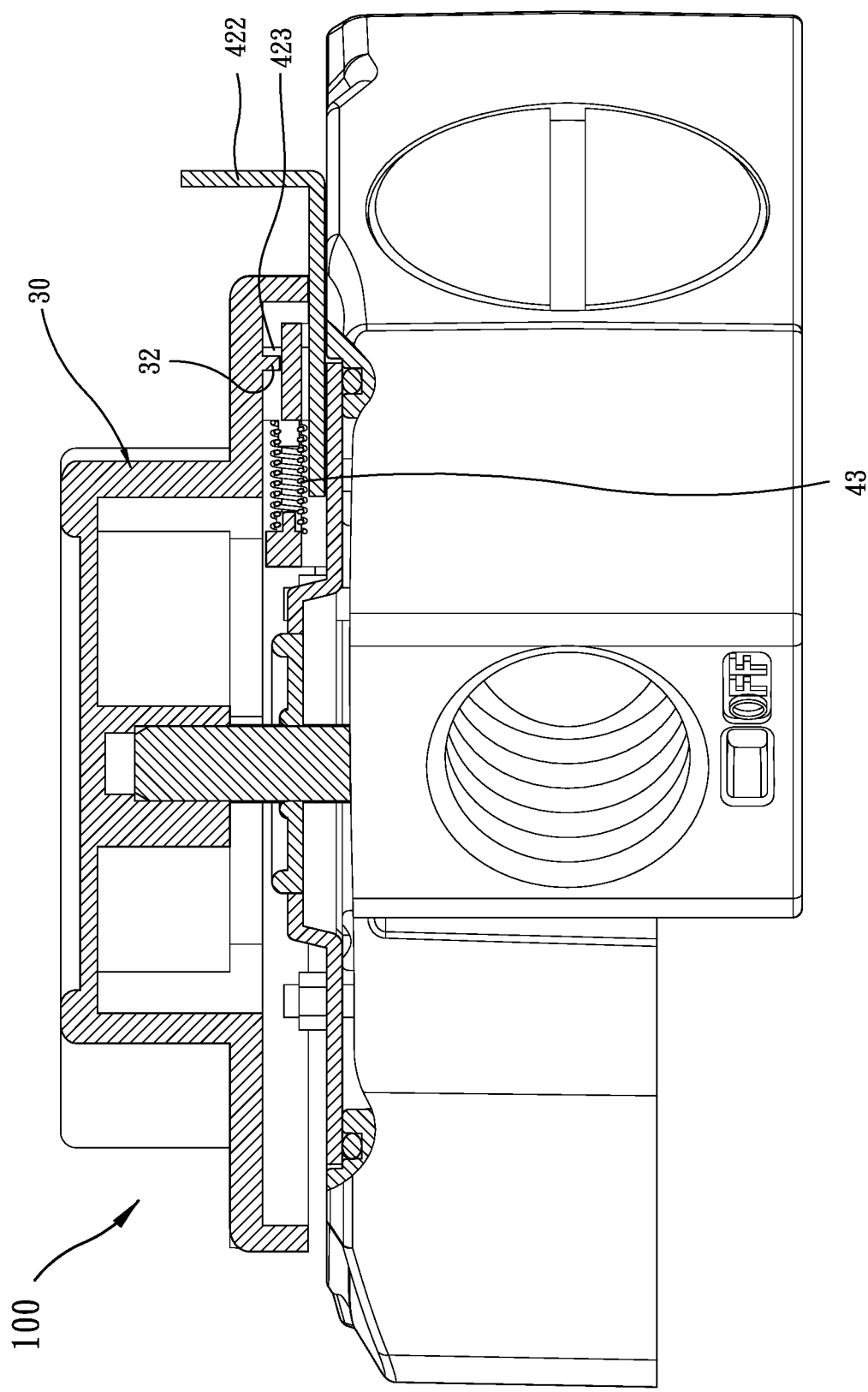

To stop the timing operation even when the scheduled counting of time does not reach, the user may manually rotate the rotary knob 30 in for example the counterclockwise direction to have the direction indicating mark 14 aligned with the closure region 34 to thereby shut off the gas. The present invention is structured to prevent the user from mistakenly over-rotating the full opening region 35 to align with the direction indicating mark 14 by applying an excessively large torque. Since the stop portion 423 of the movable seat 42 of the stop device 40 is acted upon by the elastic member 43 to be held at the stop position, meaning the stop portion 423 is located on the rotating path of the protrusion 32 of the rotary knob 30, the stop portion 423 blocks the protrusion 32 (as shown in FIGS. 10 and 12), so that the rotary knob 30 is prevented from directly rotating from the closure region 34 to the full opening region 35 to align with the direction indicating mark 14, meaning the closure region 34 is prevented from passing over the direction indicating mark 14. As such, the operation safety of the present invention is enhanced, and a situation where the present invention is mistakenly opened due to excessive rotation by a user is avoided.

Figure 11:
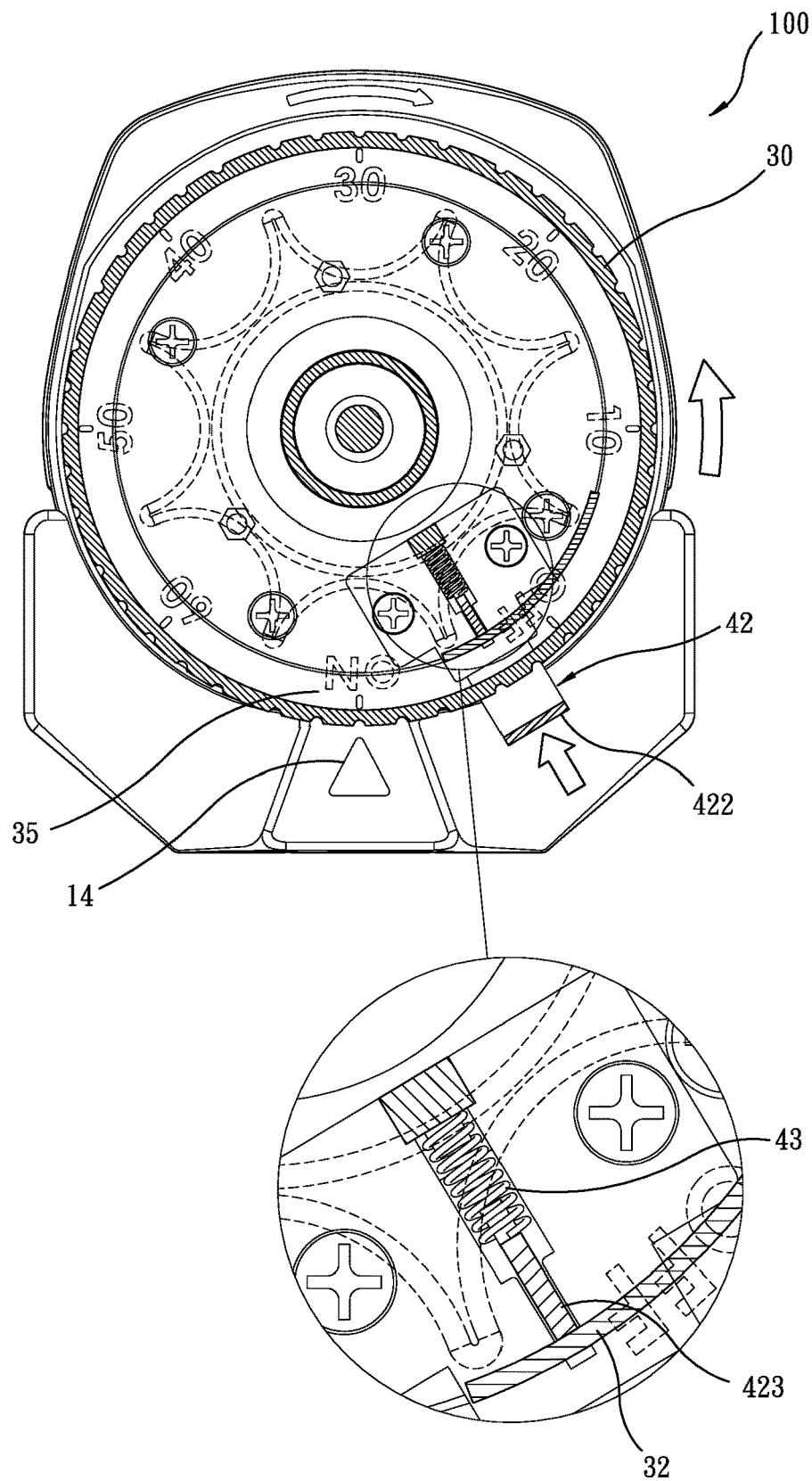
Figure 13:
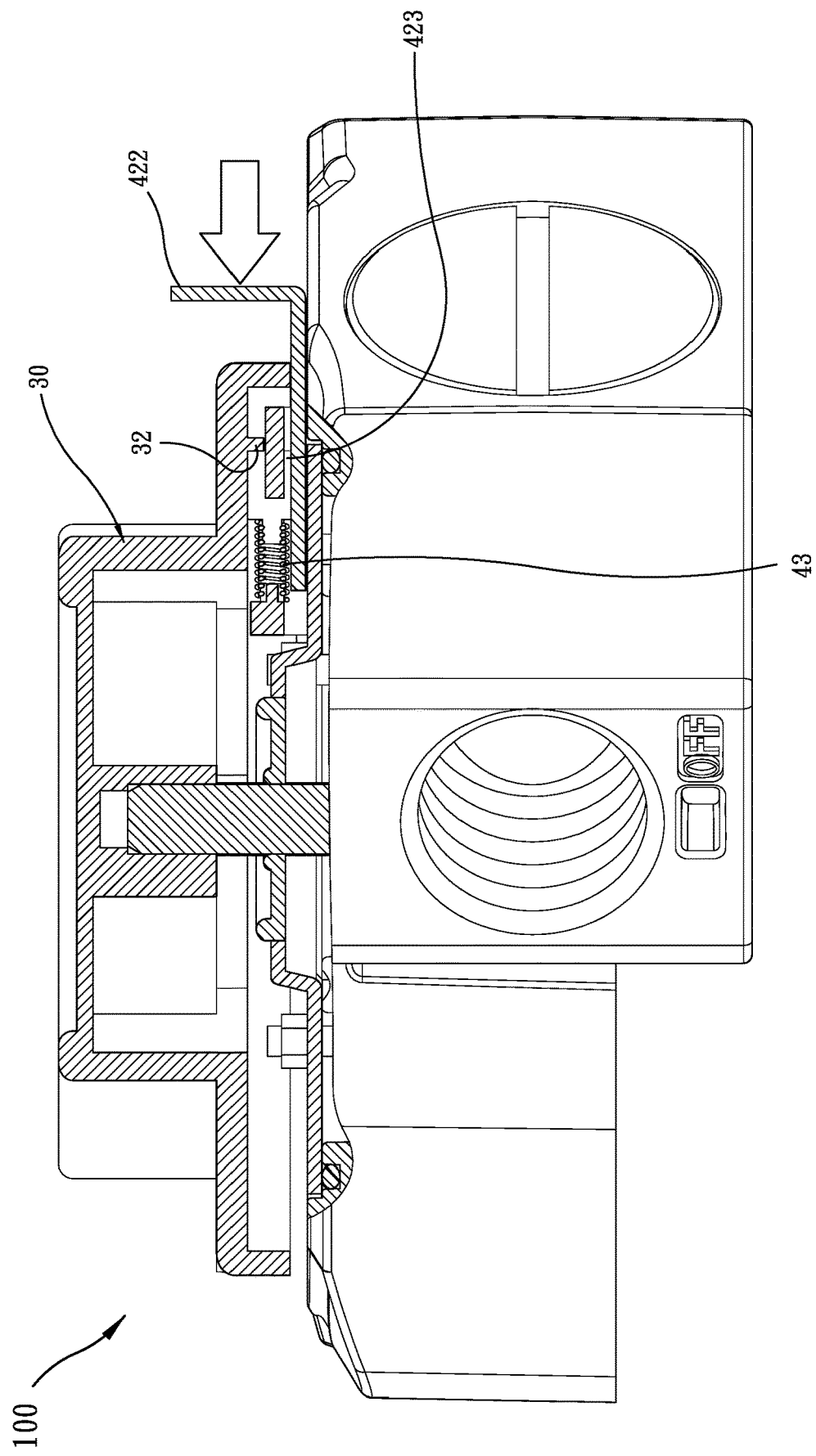

In case that, with the direction indicating mark 14 being originally in alignment with the closure region 34, the user attempts to rotate the full opening region 35 of the rotary knob 30 to align with the direction indicating mark 14, the user has to first depress the movable seat 42 of the stop device 40 to compress the elastic member 43 in order to allow the movable seat 42 to move from the stop position to the passage position, wherein the stop portion 423 is moved away from the rotating path of the protrusion 32 (as shown in FIGS. 11 and 13) to allow the rotary knob 30 to be rotated for rotating the full opening region 35 of the rotary knob 30 to align with the direction indicating mark 14.

Thus, the present invention is structured to include the additionally arranged stop device, such that, due to the spring force of the elastic member, the stop portion of the movable seat is normally set at the stop position when no external force acts thereon thereby preventing an operation of attempting to rotate the closure region to align with the indicating mark from mistaken rotation of moving the full opening region to align with the direction indicating mark, and thus, operation safety of the present invention can be greatly improved.

I claim:

1. An improved gas valve including a timer, comprising:
a valve body, which is formed, in an interior thereof, with a valve compartment and is provided, in an exterior thereof, with an inlet opening extending to and in communication with the valve compartment and an outlet opening extending to and in communication with the valve compartment, a valve core being arranged in an interior of the valve compartment, the valve core being adapted to be operated by an external force to switchably set the inlet opening to be in communication with or not in communication with the outlet opening, a direction indicating mark being arranged on a surface of the valve body;
a timer, which is mounted to the valve body and is fixed in the interior of the valve compartment, the timer being connected to the valve core to control opening and closing of the valve core;
a rotary knob, which is arranged on the valve body and connected with the timer, the rotary knob having a bottom surface that is provided with a protrusion, the rotary knob having a top surface that is provided, in a circumferentially arranged form, a closure region, a full opening region at one side of the closure region, and a time counting region at an opposite side of the closure region; and
a stop device, which is mounted to the valve body, the stop device being operated with an elastic effect to be reciprocally movable between a stop position and a passage position in such a way as to be set at the stop position as being acted upon by the elastic effect to be located on a rotating path of the protrusion of the rotary knob, wherein when the closure region of the rotary knob is in alignment with the direction indicating mark, the protrusion is in contact engagement with the stop device to prevent the closure region from moving to pass over the direction indicating mark, and when the stop device is at the passage position, the stop device is moved out of and does not stay on the rotating path of the protrusion of the rotary knob.

2. The improved gas valve including a timer according to claim 1, wherein the valve body further comprises a valve base and a valve cover, the valve compartment being formed in the valve base, the inlet opening, the outlet opening, and the direction indicating mark being formed on the valve base, the valve cover being mounted and fixed to the valve base, the valve cover being formed with a through hole penetrating top and bottom thereof, the timer comprising a driving axle, the driving axle extending through the through hole to outside, the rotary knob being formed, in a bottom surface thereof, with a fitting and connecting recess, the driving axle being connected, through insertion, to the fitting and connecting recess for rotating together.

3. The improved gas valve including a timer according to claim 2, wherein the driving axle has a noncircular cross section and the fitting and connecting recess has a noncircular cross section.

4. The improved gas valve including a timer according to claim 1, wherein the rotary knob is provided, on a top surface thereof, with a force application portion to serve as an interface for a user to apply a force thereto for controlling rotation of the rotary knob.

5. The improved gas valve including a timer according to claim 1, wherein the rotary knob has a circumferential surface on which multiple graduations are circumferentially arranged at intervals.

6. The improved gas valve including a timer according to claim 1, wherein the stop device includes a base and a movable seat, the base being mounted to the valve body, the movable seat being slidably coupled to the base to be reciprocally movable relative to the base between the stop position and the passage position, the movable seat comprising a stop portion, wherein when the movable seat is at the passage position, the stop portion is not located on the rotating path of the protrusion of the rotary knob, and when the movable seat is acted upon by the elastic effect to be located at the stop position, the stop portion is located on the rotating path of the protrusion of the rotary knob, so that when the closure region of the rotary knob is in alignment with the direction indicating mark, the protrusion is in contact engagement with the stop portion and the closure region is prevented from passing over the direction indicating mark.

7. The improved gas valve including a timer according to claim 6, wherein the stop device further comprises an elastic member; the base comprises a slide channel, a base engaging portion arranged on a bottom wall of the slide channel, and a through opening penetrating through top and bottom sides of the base, the movable seat comprising a slide portion, an interface portion connected to one end of the slide portion, and a stop portion protruding upward from a top surface of the slide portion, one end of the stop portion being provided with a movable-seat engaging portion, the slide portion being slidably received in the slide channel of the base such that the stop portion extends through the through opening, the elastic member having one end supported on the base engaging portion of the base and an opposite end supported on the movable-seat engaging portion of the movable seat, wherein the movable seat, when acted upon by an external force and thus depressed to compress the elastic member, is moved to the passage position, and when the external force is removed, the movable seat is acted upon by the elastic effect induced by the elastic member to be biased outward to the stop position.

8. The improved gas valve including a timer according to claim 7, wherein the elastic member comprises a spring.

* * * * *